(12) United States Patent
Creel et al.

(10) Patent No.: US 7,866,394 B2
(45) Date of Patent: *Jan. 11, 2011

(54) COMPOSITIONS AND METHODS OF CEMENTING IN SUBTERRANEAN FORMATIONS USING A SWELLING AGENT TO INHIBIT THE INFLUX OF WATER INTO A CEMENT SLURRY

(75) Inventors: Prentice G. Creel, Odessa, TX (US); Charles L. Boatman, Houston, TX (US); Richard H. Tate, Brownfield, TX (US); Eldon Dwyann Dalrymple, Duncan, OK (US); Stephen P. Luscombe, Midland, TX (US); John L. Eubank, Hobbs, NM (US)

(73) Assignee: Halliburton Energy Services Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/375,183

(22) Filed: Feb. 27, 2003

(65) Prior Publication Data

US 2004/0168802 A1 Sep. 2, 2004

(51) Int. Cl.
*E21B 33/14* (2006.01)
(52) U.S. Cl. ........................... 166/293; 166/300
(58) Field of Classification Search ............... 106/718, 106/724, 727, 728, 729, 730, 802, 803, 804, 106/805, 808, 810; 166/293; 405/267; 507/110, 507/111, 112, 113, 209, 211, 214, 215
See application file for complete search history.

(56) References Cited

U.S. PATENT DOCUMENTS

| | | |
|---|---|---|
| 2,649,160 A | 8/1953 | Williams et al. |
| 2,848,051 A | 8/1958 | Williams |
| 2,890,752 A | 6/1959 | Crone et al. |
| 3,132,693 A | 5/1964 | Weisend |
| 3,202,214 A | 8/1965 | McLaughlin, Jr. ............ 166/30 |
| 3,215,634 A | 11/1965 | Walkder |
| 3,247,171 A | 4/1966 | Walker et al. |
| 3,284,393 A | 11/1966 | Vanderhoff et al. |
| 3,302,717 A | 2/1967 | West et al. |
| 3,306,870 A * | 2/1967 | Eilers et al. ................. 524/413 |
| 3,375,872 A | 4/1968 | McLaughlin et al. |
| 3,376,926 A | 4/1968 | McLaughlin et al. .......... 166/29 |
| 3,447,608 A * | 6/1969 | Fry et al. ..................... 166/293 |
| 3,448,800 A * | 6/1969 | Wahl et al. .................. 166/294 |
| 3,464,494 A | 9/1969 | McLaughlin |
| 3,493,529 A * | 2/1970 | Krottinger et al. ............ 524/5 |
| 3,556,221 A | 1/1971 | Haws et al. |
| 3,721,295 A | 3/1973 | Bott |
| 3,724,547 A | 4/1973 | Bott |
| 3,818,998 A | 6/1974 | Hessert |
| 3,893,510 A | 7/1975 | Elphingstone et al. |
| 3,918,523 A * | 11/1975 | Stuber ........................ 166/285 |
| 3,953,336 A | 4/1976 | Daigle |
| 3,959,003 A | 5/1976 | Ostroot et al. |
| 4,034,809 A | 7/1977 | Phillips et al. |
| 4,069,062 A | 1/1978 | Bürge |
| 4,083,407 A | 4/1978 | Griffin, Jr. et al. |
| 4,120,361 A | 10/1978 | Threlkeld et al. |
| 4,172,066 A | 10/1979 | Zweigle et al. |
| 4,182,417 A | 1/1980 | McDonald et al. |
| 4,191,254 A | 3/1980 | Baughman et al. |
| 4,202,413 A | 5/1980 | Messenger .................. 166/292 |
| 4,205,611 A | 6/1980 | Slawinski |
| 4,232,741 A | 11/1980 | Richardson et al. |
| 4,235,291 A * | 11/1980 | Messenger .................. 166/292 |
| 4,248,304 A | 2/1981 | Phillips |
| 4,276,935 A | 7/1981 | Hessert et al. |
| 4,282,928 A | 8/1981 | McDonald et al. |

(Continued)

FOREIGN PATENT DOCUMENTS

CN 1348932 5/2002

(Continued)

OTHER PUBLICATIONS

Derwent Abstract No. 1983-704150, abstract of Soviet Union Patent Specification No. 953187 (Aug. 1982).*
Translation of Russian Patent Application Patent No. RU 2107158 C1 (Mar. 1998).*
Translation of Russian Patent Application Patent No. RU 2160822 C2 (Dec. 2000).*
Translation of Russian Patent Application Patent No. RU 2183264 C2 (Jun. 2002).*
Chemical Abstract No. 1992-072444, abstract of South African Patent Specification No. ZA 9100876A (Dec. 1991).*
Chemical Abstract No. 1998-519099, abstract of Russian Patent Specification No. 2107158 C1 (Mar. 1998).*
Chemical Abstract No. 2001-180538, abstract of Russian Patent Specification No. 2160822 C2 (Dec. 2000).*
Chemical Abstract No. 2002-525993, abstract of Russian Patent Specification No. 2183264 C2 (Jun. 2002).*

(Continued)

*Primary Examiner*—Zakiya W. Bates
(74) *Attorney, Agent, or Firm*—Craig W. Roddy; Conley Rose, P.C.

(57) ABSTRACT

Methods of cementing in subterranean formations, cement compositions, and methods for making the compositions are provided. A cement slurry is passed into a subterranean formation, and a swelling agent is passed into the subterranean formation to reduce an amount of water flowing into the cement slurry. The swelling agent may be combined with a carrier fluid before being displaced into the subterranean formation. Alternatively, the swelling agent may be premixed with the cement slurry to form a new cement composition, followed by displacing the cement composition into the subterranean formation. The swelling agent is present in an amount effective to, upon absorption of water and swelling to form a gel mass, substantially block the flow path of the water into the cement composition or reduce losses to low pore pressure intervals, thereby preventing the integrity of the cement composition from being compromised or lost to voidage, fractures, fissures, etc.

30 Claims, No Drawings

U.S. PATENT DOCUMENTS

| | | | |
|---|---|---|---|
| 4,299,710 A | 11/1981 | Dupre et al. | |
| 4,304,298 A | 12/1981 | Sutton | |
| 4,340,427 A * | 7/1982 | Sutton | 106/641 |
| 4,367,093 A | 1/1983 | Burkhalter et al. | |
| 4,391,925 A | 7/1983 | Mintz et al. | |
| 4,450,010 A | 5/1984 | Burkhalter et al. | |
| 4,463,808 A | 8/1984 | Mason et al. | |
| 4,466,831 A | 8/1984 | Murphey | 106/74 |
| 4,478,640 A * | 10/1984 | Holland | 106/607 |
| 4,487,864 A * | 12/1984 | Bermudez et al. | 524/2 |
| 4,507,154 A * | 3/1985 | Burge et al. | 106/728 |
| 4,515,216 A | 5/1985 | Childs et al. | 166/293 |
| 4,565,578 A | 1/1986 | Sutton et al. | |
| 4,572,295 A | 2/1986 | Walley | |
| 4,579,668 A | 4/1986 | Messenger | 252/8.5 LC |
| 4,588,031 A | 5/1986 | Oliver, Jr. et al. | |
| 4,635,726 A | 1/1987 | Walker | |
| 4,646,834 A * | 3/1987 | Bannister | 166/291 |
| 4,664,816 A | 5/1987 | Walker | |
| 4,670,501 A | 6/1987 | Dymond et al. | |
| 4,690,996 A | 9/1987 | Shih et al. | |
| 4,704,213 A | 11/1987 | Delhommer et al. | |
| 4,706,755 A * | 11/1987 | Roark et al. | 166/295 |
| 4,724,906 A | 2/1988 | Sydansk | |
| 4,730,674 A | 3/1988 | Burdge et al. | |
| 4,777,200 A | 10/1988 | Dymond et al. | |
| 4,818,288 A | 4/1989 | Aignesberger et al. | |
| 4,836,940 A * | 6/1989 | Alexander | 507/119 |
| 4,886,550 A * | 12/1989 | Alexander | 106/811 |
| 4,896,724 A | 1/1990 | Hazlett et al. | |
| 4,899,819 A | 2/1990 | Hazlett et al. | |
| 4,941,533 A | 7/1990 | Buller et al. | |
| 4,961,760 A | 10/1990 | Caskey et al. | |
| 4,961,790 A | 10/1990 | Smith et al. | |
| 4,964,918 A | 10/1990 | Brown et al. | |
| 4,989,673 A | 2/1991 | Sydansk | |
| 5,002,127 A | 3/1991 | Dalrymple et al. | |
| 5,034,139 A | 7/1991 | Reid et al. | |
| 5,078,212 A | 1/1992 | Boyle et al. | |
| 5,086,841 A * | 2/1992 | Reid et al. | 166/295 |
| 5,089,538 A * | 2/1992 | Iizuka et al. | 523/132 |
| 5,106,516 A | 4/1992 | Mueller et al. | |
| 5,120,367 A | 6/1992 | Smith et al. | |
| 5,145,012 A | 9/1992 | Hutchins et al. | |
| 5,232,910 A | 8/1993 | Mueller et al. | |
| 5,252,554 A | 10/1993 | Mueller et al. | |
| 5,318,954 A | 6/1994 | Mueller et al. | |
| 5,346,012 A | 9/1994 | Heathman et al. | |
| 5,351,759 A | 10/1994 | Nahm et al. | |
| 5,385,206 A | 1/1995 | Thomas | |
| 5,421,410 A | 6/1995 | Irani | |
| 5,439,057 A | 8/1995 | Weaver et al. | |
| 5,447,197 A | 9/1995 | Rae et al. | |
| 5,465,792 A | 11/1995 | Dawson et al. | |
| 5,476,142 A * | 12/1995 | Kajita | 166/294 |
| 5,512,096 A * | 4/1996 | Krause | 106/718 |
| 5,547,506 A | 8/1996 | Rae et al. | |
| 5,550,189 A | 8/1996 | Qin et al. | |
| 5,588,488 A | 12/1996 | Vijn et al. | |
| 5,591,701 A | 1/1997 | Thomas | |
| 5,707,443 A * | 1/1998 | Brown et al. | 106/713 |
| 5,718,292 A | 2/1998 | Heathman et al. | |
| 5,735,349 A | 4/1998 | Dawson et al. | |
| RE36,066 E | 1/1999 | Mueller et al. | |
| 5,881,826 A | 3/1999 | Brookey et al. | |
| 5,913,364 A | 6/1999 | Sweatman | |
| 5,921,319 A | 7/1999 | Curtice | |
| 6,060,434 A | 5/2000 | Sweatman et al. | |
| 6,123,159 A | 9/2000 | Brookey et al. | |
| 6,148,917 A | 11/2000 | Brookey et al. | |
| 6,156,708 A | 12/2000 | Brookey et al. | |
| 6,167,967 B1 | 1/2001 | Sweatman | |
| 6,169,058 B1 | 1/2001 | Le et al. | |
| 6,187,839 B1 | 2/2001 | Eoff et al. | |
| 6,218,343 B1 | 4/2001 | Burts, Jr. | |
| 6,258,757 B1 | 7/2001 | Sweatman et al. | |
| 6,390,208 B1 | 5/2002 | Brookey | |
| 6,405,801 B1 | 6/2002 | Vijn et al. | |
| 6,431,282 B1 | 8/2002 | Bosma et al. | |
| 6,457,523 B1 | 10/2002 | Vijn et al. | |
| 6,460,632 B1 | 10/2002 | Chatterji et al. | |
| 6,465,397 B1 | 10/2002 | Patterson | |
| 6,508,306 B1 | 1/2003 | Reddy et al. | 166/295 |
| 6,516,881 B2 | 2/2003 | Hailey, Jr. | |
| 6,516,882 B2 | 2/2003 | McGregor et al. | |
| 6,518,224 B2 | 2/2003 | Wood | |
| 6,554,081 B1 | 4/2003 | Brooks et al. | |
| 6,561,269 B1 | 5/2003 | Brown et al. | |
| 6,581,701 B2 * | 6/2003 | Heying | 175/72 |
| 6,610,140 B2 | 8/2003 | Vijn et al. | |
| 6,616,753 B2 | 9/2003 | Reddy et al. | |
| 6,626,992 B2 | 9/2003 | Vijn et al. | |
| 6,631,766 B2 * | 10/2003 | Brothers et al. | 166/293 |
| 6,655,475 B1 | 12/2003 | Wald | |
| 6,702,044 B2 | 3/2004 | Reddy et al. | |
| 6,708,760 B1 | 3/2004 | Chatterji et al. | |
| 6,715,553 B2 | 4/2004 | Reddy et al. | |
| 6,716,797 B2 | 4/2004 | Brookey | |
| 6,722,433 B2 | 4/2004 | Brothers et al. | |
| 6,722,434 B2 | 4/2004 | Reddy et al. | |
| 6,730,636 B2 | 5/2004 | Vijn et al. | |
| 6,767,867 B2 | 7/2004 | Chatterji et al. | |
| 6,770,601 B1 | 8/2004 | Brookey | |
| 6,777,377 B2 | 8/2004 | Myers et al. | |
| 6,800,593 B2 | 10/2004 | Dobson, Jr. et al. | |
| 6,858,566 B1 | 2/2005 | Reddy et al. | |
| 6,887,832 B2 | 5/2005 | Kirsner et al. | |
| 7,156,174 B2 | 1/2007 | Roddy et al. | |
| 7,204,312 B2 | 4/2007 | Roddy et al. | |
| 7,261,939 B2 | 8/2007 | Hallett et al. | |
| 2001/0018975 A1 | 9/2001 | Richardson | |
| 2002/0040812 A1 | 4/2002 | Heying | |
| 2002/0170717 A1 | 11/2002 | Venning | |
| 2002/0188040 A1 | 12/2002 | Chen et al. | |
| 2003/0008779 A1 | 1/2003 | Chen et al. | |
| 2003/0062170 A1 | 4/2003 | Slack | |
| 2003/0066651 A1 | 4/2003 | Johnson | |
| 2003/0075315 A1 | 4/2003 | Nguyen et al. | |
| 2003/0092582 A1 | 5/2003 | Reddy et al. | |
| 2003/0144153 A1 | 7/2003 | Kirsner et al. | |
| 2003/0181338 A1 | 9/2003 | Sweatman et al. | |
| 2003/0186819 A1 | 10/2003 | Shaarpour | |
| 2003/0201103 A1 | 10/2003 | Brookey et al. | |
| 2004/0069537 A1 | 4/2004 | Reddy et al. | |
| 2004/0069538 A1 | 4/2004 | Reddy et al. | |
| 2004/0108141 A1 | 6/2004 | Reddy et al. | |
| 2004/0168798 A1 | 9/2004 | Creel et al. | |
| 2004/0168801 A1 | 9/2004 | Reddy et al. | |
| 2004/0168802 A1 | 9/2004 | Creel et al. | |
| 2004/0168804 A1 * | 9/2004 | Reddy et al. | 166/295 |
| 2004/0168830 A1 | 9/2004 | Reddy et al. | |
| 2004/0171499 A1 | 9/2004 | Ravi et al. | |
| 2004/0180794 A1 | 9/2004 | Reddy et al. | |
| 2004/0221990 A1 | 11/2004 | Heathman et al. | |
| 2004/0221991 A1 | 11/2004 | Brothers et al. | |
| 2005/0009710 A1 | 1/2005 | Heathman et al. | |
| 2005/0032652 A1 | 2/2005 | Kirsner et al. | |
| 2005/0051363 A1 | 3/2005 | Munoz, Jr. et al. | |
| 2005/0061505 A1 | 3/2005 | Caveny et al. | |
| 2005/0098317 A1 | 5/2005 | Reddy et al. | |
| 2005/0113260 A1 | 5/2005 | Wood | |
| 2005/0113262 A1 | 5/2005 | Ravi et al. | |
| 2005/0124502 A1 | 6/2005 | Shaarpour | |
| 2005/0199401 A1 | 9/2005 | Patel et al. | |

| | | |
|---|---|---|
| 2006/0211580 A1 | 9/2006 | Wang et al. |
| 2006/0213662 A1 | 9/2006 | Creel et al. |
| 2007/0012447 A1 | 1/2007 | Fang et al. |

FOREIGN PATENT DOCUMENTS

| | | |
|---|---|---|
| CN | 1364739 | 8/2002 |
| DE | 217796 | 1/1985 |
| DE | 100 37 118 A 1 | 2/2002 |
| EP | 0 401 936 A2 | 12/1990 |
| EP | 0530768 A1 | 9/1992 |
| EP | 0 566 118 B2 | 10/2001 |
| EP | 1 188 726 A2 | 3/2002 |
| EP | 1 316 540 A2 | 6/2003 |
| GB | 2271350 A | 4/1994 |
| GB | 2325949 A | 12/1998 |
| GB | 2 371 319 A | 7/2002 |
| JP | 53-62308 A * | 6/1978 |
| JP | 60-235863 A * | 11/1985 |
| JP | 60235863 | 11/1985 |
| JP | 5-59886 A * | 3/1993 |
| JP | 10-88508 A * | 4/1998 |
| JP | 10088508 | 4/1998 |
| JP | 2000-272943 A * | 10/2000 |
| JP | 2001-48627 A * | 2/2001 |
| JP | 2001048627 | 2/2001 |
| JP | 2001-146457 A * | 5/2001 |
| JP | 2001146457 A * | 5/2001 |
| RU | 2160822 C2 * | 12/2000 |
| SU | 953187 A | 8/1982 |
| SU | 1723312 | 3/1992 |
| WO | WO 84/01943 | 5/1984 |
| WO | 9916723 A1 | 4/1999 |
| WO | 0174967 A1 | 10/2001 |
| WO | WO 02/084070 | 10/2002 |
| WO | WO 2004/101463 A2 | 11/2004 |
| WO | WO 2004/101951 A1 | 11/2004 |
| WO | WO 2004/101952 A1 | 11/2004 |

OTHER PUBLICATIONS

Foreign communication from a related counterpart application dated Apr. 16, 2004.
Halliburton brochure entitled "Super CBL Additive Cement Additive" dated 1999.
Halliburton brochure entitled "MicroBond Expanding Additive for Cement" dated 1999.
Halliburton brochure entitled "PlexPlug Service Stop Lost Circulation, Hold Your Bottom Line" dated 1998.
Halliburton brochrure entitled "FlexPlug Service Helps Operator Solve Lost Circulation Problems Quickly and Effectively."
Halliburton brochure entitled "FlexPlug® W Lost-Circulation Material" dated, Aug. 2004.
Halliburton brochure entitled "FlexPlug® OBM Lost-Circulation Material" dated, Aug. 2004.
Halliburton brochure entitled "CFR-3™ Cement Friction Reducer Dispersant" dated, Aug. 2004.
Halliburton brochure entitled "Flo-Chek® A Additive" dated 1999.
Halliburton brochure entitled "HydroChek Service—MOC/One Slurry for Selective Water Control".
Halliburton brochure entitled "Accolade™ Drilling Fluid Exceeds New GOM Environmental Standards and Boosts Performance" dated, Apr. 2002.
Baroid Fluid Services brochure entitled "ADAPTA™ HPHT Filtration Reducer" dated, Apr. 2005.
Baroid Fluid Services brochure entitled "Aquagel® Viscosifier" dated, Apr. 2005.
Baroid Fluid Services brochure entitled "BARAZAN® D Viscosifier/Suspension Agent" dated, Apr. 2005.
Baroid Fluid Services brochrure entitled "BARAZAN® D Plus Viscosifier/Suspension Agent" dated, Apr. 2005.
Baroid Fluid Services brochure entitled "CARBONOX® Filtration Control Agent" dated, Apr. 2005.
Baroid Fluid Services brochure entitled "CLAY GRABBER® Flocculant" dated, Apr. 2005.
Baroid Fluid Services brochure entitled "CLAYSEAL® Shale Stabilizer" dated, Apr. 2005.
Baroid Fluid Services brochure entitled "CLAY SYNC™ Shale Stabilizer" dated, Apr. 2005.
Baroid Fluid Services brochure entitled "COLDTROL® Thinner" dated, Apr. 2005.
Baroid Fluid Services brochure entitled "DURATONE® E Filtration Control Agent" dated, Apr. 2005.
Baroid Fluid Services brochure entitled "DURATONE® HT Filtration Control Agent" dated, Apr. 2005.
Baroid Fluid Services brochure entitled "EZ MULI® NT Emulsifier" dated, Apr. 2005.
Baroid Fluid Services brochure entitled "FILTER-CHEK™ Filtration Control Agent" dated, Apr. 2005.
Baroid Fluid Services brochrure entitled "GELTONE® Viscosifier" dated, Apr. 2005.
Baroid Fluid services brochure entitled "GELTONE® II Viscosifier" dated, Apr. 2005.
Baroid Fluid Services brochure entitled "GELTONE® IV Viscosifier" dated, Apr. 2005.
Baroid Fluid Services brochure entitled "GELTONE® V Viscosifier" dated, Apr. 2005.
Baroid Fluid Services brochure entitled "GEM™ 2000 Shale Stabilizer" date, Apr. 2005.
Baroid Fluid Services brochure entitled GEM™ CP Shale Stabilizer dated, Apr. 2005.
Baroid Fluid Services brochure entitled "GEM™ GP Shale Stabilizer" dated, Apr. 2005.
Baroid Fluid Services brochure entitled "Quik-Thine® Thinner" dated, Apr. 2005.
Baroid Fluid Services brochure entitled "EZ MULI® NT Emulsifier" dated, Apr. 2005.
Baroid Fluid Services brochure entitled "RHEMOD™ Viscosifier/Suspension Agent" dated, Apr. 2005.
Baroid Fluid Services brochrure entitled "STEELSEAL® Lost Circulation Material" dated, Apr. 2005.
Baroid Fluid Services brochure entitled "SUSPENTONE™ Suspension Agent" dated, Apr. 2005.
Baroid Fluid Services brochure entitled "LE™ SUPERMUL Emulsifier" dated, Apr. 2005.
Kaiser, T.M.V. et al. "Inflow Analysis and Optimization of Slotted Liner" dated 2002.
Smith, Richard et al., "Coordinated optimization, new well design reduce wellbore stability problems in Valhall field" Oil & Gas Journal, dated Jan. 5, 2004.
Paper entitled "Halliburton's solution to highly reactive clay formation challenges" dated Jul. 2003.
Petromin article entitled "Halliburton's solution to highly reactive clay formation challenges" date. Jul. 2002.
Roddy, Craig et al, Compositions and methods for the delivery of chemical components in subterranean well bores' filed Jan. 30, 2004 as U.S. Appl. No. 10/768,323.
Roddy, Craig et al. "Contained micro-particles for use in well bore operations" filed Jan. 30, 2004, as U.S. Appl. No. 10/768,864.
Santra, Ashok K. et al. "Methods of generating gas in a plugging composition to improve its sealing ability in a downhole . . . " filed Oct. 18, 2004 as U.S. Appl. No. 10/967,121.
West, Gary C et al. "Inhibitive water-based drilling fluid system and method for drilling sands and other water-sensitive" filed Apr. 24, 2004 as U.S. Appl. No. 10/831,668.
Advisory Action dated Jun. 6, 2008 (3 pages), U.S. Appl. No. 10/967,121, filed Oct. 18, 2004.
Advisory Action dated Apr. 15, 2009 (3 pages), U.S. Appl. No. 10/967,121, filed Oct. 18, 2004.
Derwent Abstract No. 2001-180538, abstract of Russian Patent Publication No. 2160822 C2, 2009, 2 pages, Derwent Information Ltd.
Office Action dated Apr. 10, 2009 (14 pages), U.S. Appl. No. 11/180,767, filed Jul. 13, 2005.

Office Action dated Apr. 15, 2009 (12 pages), U.S. Appl. No. 10/970,444, filed Oct. 21, 2004.

Office Action dated Jun. 9, 2009 (10 pages), U.S. Appl. No. 11/090,496, filed Mar. 25, 2005.

Office Action dated Jul. 21, 2009 (18 pages), U.S. Appl. No. 10/967,121, filed Oct. 18, 2004.

Foreign communiction—International Search Report and Written Opinion, PCT/EP2004/005479, Sep. 30, 2004, 8 pages.

Foreign communication—International Preliminary Report on Patentability, PCT/EP2004/005479, Aug. 30, 2005, 7 pages.

Baroid brochure entitled "BARACARB® Bridging Agent," 2002, 2 pages, Halliburton.

Foreign Communication from a related counterpart application—International Search Report and Opinion, PCT/GB2004/000411, Jun. 16, 2004, 6 pages.

Foreign Communication from a related counterpart application—International Search Report and Written Opinion, PCT/GB2004/000671, Jul. 12, 2004, 6 pages.

Foreign Communication from a related counterpart application—International Search Report and Written Opinion, PCT/GB2004/001646, Jul. 27, 2004, 7 pages.

Foreign Communication from a related counterpart application—International Search Report and Written Opinion, PCT/GB2006/002659, Oct. 12, 2006, 11 pages.

Baroid brochure entitled "Diamond Seal™" dated 1998.

Baroid brochure entitled "Hydro-Plug™ Lost Circulation Plug" dated 2002.

Patent application entitled "Methods of Using a Swelling Agent In a Wellbore", by Prentice G. Creel et al., U.S. Appl. No. 10/970,444, filed Oct. 20, 2004.

* cited by examiner

COMPOSITIONS AND METHODS OF CEMENTING IN SUBTERRANEAN FORMATIONS USING A SWELLING AGENT TO INHIBIT THE INFLUX OF WATER INTO A CEMENT SLURRY

CROSS-REFERENCE TO RELATED APPLICATIONS

Related applications filed concurrently herewith are entitled "Methods of Passing a Swelling Agent into a Reservoir to Block Undesirable Flow Paths During Oil Production" and "Methods of Using a Swelling Agent to Prevent a Cement Slurry from being Lost to a Subterranean Formation," each of which is incorporated by reference herein in its entirety.

FIELD OF THE INVENTION

This invention generally relates to compositions and methods for cementing in subterranean formations. More specifically, the invention relates to introducing a swelling agent to a subterranean formation to reduce the amount of water flowing into a cement slurry placed in the subterranean formation, thereby preventing the integrity of the cement slurry from being compromised.

BACKGROUND OF THE INVENTION

Well cementing is a process used in penetrating subterranean formations that produce oil and gas. In well cementing, a well bore is drilled while a drilling fluid is circulated through the well bore. The circulation of the drilling fluid is then terminated, and a string of pipe, e.g., casing, is run in the well bore. The drilling fluid in the well bore is conditioned by circulating it downwardly through the interior of the pipe and upwardly through the annulus, which is located between the exterior of the pipe and the walls of the well bore. Next, primary cementing is typically performed whereby a slurry of cement in water is placed in the annulus and permitted to set, i.e., harden into a solid mass, to thereby attach the string of pipe to the walls of the well bore and seal the annulus. Subsequent secondary cementing operations, i.e., any cementing operation after the primary cementing operation, may also be performed. One example of a secondary cementing operation is squeeze cementing whereby a cement slurry is forced under pressure to areas of lost integrity in the annulus to seal off those areas.

One problem commonly encountered during primary and secondary cementing operations is the movement of water from the subterranean formation into the well bore, resulting in the influx of water into cement slurries that have been placed in the well bore. In particular, the influx of water occurs during a transition phase in which the cement slurry changes from a true hydraulic fluid to a highly viscous mass showing some solid characteristics. When first placed in the well bore, the cement slurry acts as a true liquid and thus transmits hydrostatic pressure. During the transition phase, certain events occur that cause the cement slurry to lose its ability to transmit hydrostatic pressure. One of those events is the loss of fluid from the slurry to the subterranean zone. Another event is the development of static gel strength, i.e., stiffness, in the slurry. When the pressure exerted on the formation by the cement slurry falls below the pressure of the water in the formation, the water begins to flow into and through the cement slurry. This influx of water can occur during dynamic and static states of the cement slurry.

As a result of water influxes into and crossbows through the cement slurry, flow channels form therein that remain after the cement slurry has completely set. Those flow channels allow the water to flow from one subterranean zone to another such that zonal isolation is no longer achieved. Further, the water intermixes with and dilutes the cement slurry, causing deterioration of the cement properties such as its density, its final compressive strength, and its rheology. As such, the water adversely affects the integrity of the cement. Secondary cementing is often used to repair the lost integrity of the cement placed in the annulus during primary cementing. However, the cement slurries employed during secondary cementing also become deteriorated due to the continued influx of water. The secondary cementing operation therefore may fail to perform as designed in forming a sealing or blocking mechanism.

Repairing the deteriorated cement can be both time consuming and costly. As such, various chemicals have been used to attempt to prevent the influx of water into the cement. For example, silicates such as sodium silicate have been added to the cement or injected ahead of the cement to react with it, hydrate it, and cause it to set more quickly. Other chemicals have been added to the cement to increase its viscosity and make it less permeable to water. However, such chemicals often become diluted and dispersed before they can effectively inhibit the influx of water. It would therefore be desirable to develop improved processes for protecting cement slurries against deterioration caused by the influx of water.

SUMMARY OF THE INVENTION

The present invention includes methods for performing well cementing. According to an embodiment, a cement slurry is passed into a subterranean formation, and a swelling agent is also passed into the subterranean formation to reduce an amount of water flowing into the cement slurry. The swelling agent may be combined with a carrier fluid that is displaced into the subterranean formation before the cement slurry is displaced therein. Alternatively, the swelling agent may be pre-mixed with the cement slurry, followed by concurrently displacing the swelling agent and the cement slurry into the subterranean formation. After passing into the subterranean formation, the swelling agent absorbs water therein. As the swelling agent absorbs water, it swells to form a gel mass that substantially blocks the flow path of water into the cement slurry placed in the subterranean formation. Accordingly, the swelling agent helps prevent the integrity of the cement slurry from being compromised by the influx and crossbows of water.

The present invention further includes cement compositions and methods for making the cement composition. The cement compositions comprise cement combined with a swelling agent that is capable of absorbing water and of swelling as it absorbs the water. The swelling agent is also insoluble in water and thus resists dilution by water in the subterranean formation. The swelling agent is preferably a crosslinked polyacrylamide.

DETAILED DESCRIPTION OF THE PREFERRED EMBODIMENTS

According to the present invention, well cementing methods are performed in which an effective amount of one or more swelling agents is passed into a well bore to reduce the influx of water into a cement slurry placed in the well bore. The presence of the swelling agent in the well bore serves to reduce the amount of water available to intermix with and dilute the cement slurry. The swelling agent may be placed into the well bore before the cement is passed into the well bore, concurrent with the passing of cement into the well bore, or after the cement is passed into the wellbore.

According to preferred embodiments, a primary cementing process is carried out according to standard well cementing practices. The primary cementing process includes drilling a well bore down to a subterranean zone while circulating a drilling fluid through the well bore. A string of pipe, e.g., casing, is then run in the well bore. The drilling fluid is conditioned by circulating it downwardly through the interior of the pipe and upwardly through the annulus, which is located between the exterior of the pipe and the walls of the well bore. A carrier solution containing the swelling agent and a carrier fluid may then be displaced into the well bore, followed by displacing a cement slurry down through the pipe and up through the annulus in the well bore. Alternatively, the swelling agent may be combined with the cement slurry before concurrently displacing the swelling agent and the cement slurry into the well bore.

Any secondary cementing operations known in the art may also be performed using the swelling agent. For example, the cement sheath formed in the annulus as a result of primary cementing may contain permeable areas such as fractures, fissures, high permeability streaks, and/or annular voids through which water can flow. Channels of water thus may undesirably flow behind the casing. A cement squeezing technique may be employed to force cement into the permeable areas or voidage so as to seal or block the flow paths of water. Before performing cement squeezing, a swelling agent may be displaced into the well bore via a carrier fluid, or alternatively, it may be combined with a cement slurry before the slurry is displaced into the well bore.

In an embodiment, the well bore is monitored to detect and locate sources of water (such as fissures, cracks, fractures, streaks, flow channels, voids, and the like) that are suitable for plugging via introduction of the swelling agent. Any suitable means or methods for locating such sources of water may be used as known to those of skill in the art. For example, prior to injecting the swelling agent into the well bore, production logs such as temperature, fluid density, hydro, and flowmeter logs can be used singly or in combination to detect where water is flowing into the well bore. In addition, a magnetic resonance imaging log (MRIL) tool may be employed to analyze the well bore to determine where mobile water is present. Additional disclosure regarding MRIL tools can be found in U.S. Pat. No. 6,283,210, which is incorporated by reference herein in its entirety. Another diagnostic technique that may be utilized to locate flowing water in the well bore involves exciting oxygen molecules. In addition, a 360° depth of view tool may be used to examine the well bore for fractures, fissures, streaks, and voids.

Detecting the locations of flowing water in the well bore allows the swelling agent to be strategically placed in close proximity to the source of the flowing water. For example, the swelling agent can be placed in fractures, fissures, streaks, and voids found in the rock surrounding the well bore or in the cement sheath located in the annulus of the well bore. Preferably, the swelling agent does not immediately absorb water but begins to absorb water after there has been sufficient time to place it downhole in close proximity to the water source. While downhole, the swelling agent begins to absorb the water and swell into a gel mass that is substantially resistant to the flow of water therethrough, thereby effectively plugging the fractures, fissures, streaks, and voids through which the water could otherwise pass for at least a period of time sufficient to allow the cement to set up, harden, and thus become impervious to further degradation with a potential for flux or flow of water from formation sources.

The swelling agent is defined as and may be any suitable material that absorbs water and swells (i.e., expands) as it absorbs the water. Preferably, the swelling agent is insoluble in water and thus avoids becoming diluted and washed away by the water flowing through the well bore. More preferably, the swelling agent forms a gel mass upon swelling that can be effective for blocking a flow path of the water into the cement slurry. Most preferably, the gel mass has a relatively low permeability to water and thus creates a barrier between the water and cement slurries placed in the well bore. A gel is herein defined as a crosslinked polymer network swollen in a liquid. Preferably, the crosslinker is part of the polymer and thus will not absorb out of the polymer. Suitable swelling agents include those known as superabsorbents, which are commonly used in absorbent products such as diapers, training pants, and feminine care products. Superabsorbents are swellable crosslinked polymers, which have the ability to absorb and store many times their own weight of aqueous liquids by forming a gel. The superabsorbents retain the liquid that they absorb and typically do not release the liquid, even under pressure. Examples of superabsorbents are sodium acrylate-based polymers having three dimensional, network-like molecular structures. The polymer chains are formed by the reaction/joining of millions of identical units of acrylic acid monomer, which have been substantially neutralized with sodium hydroxide (caustic soda). Crosslinking chemicals tie the chains together to form a three-dimensional network, enabling the superabsorbents to absorb water or water-based solutions into the spaces in the molecular network, and thus forming a gel and locking up the liquid.

Examples of suitable swelling agents include, but are not limited to, polyacrylamide, polyacrylate, hydrolyzed polyacrylonitrile, carboxyalkyl cellulose, carboxymethyl starch, salts of carboxymethyl cellulose, carboxyalkyl polysaccharide, and combinations thereof. The swelling agent is preferably a crystalline polymer that has been dehydrated, more preferably a crosslinked polyacrylamide, and most preferably a crosslinked polyacrylamide in the form of a hard crystal.

A crosslinked polyacrylamide known as DIAMOND SEAL polymer may be purchased from Baroid Drilling Fluids, Inc. The DIAMOND SEAL polymer is available in grind sizes of 1 mm, 4 mm, and 14 mm and may be ground even smaller if needed. For example, a smaller grind size may be required to allow its crystals to enter very small fractures, fissures, and so forth. The DIAMOND SEAL polymer possesses certain qualities that make it an exceptional swelling agent. For example, the DIAMOND SEAL polymer is water-insoluble and is resistant to deterioration by carbon dioxide, bacteria, and subterranean minerals. Further, the DIAMOND SEAL polymer can withstand temperatures up to at least 250° F. without experiencing breakdown and thus may be used in the majority of locations where well bores are drilled. Other suitable swelling agents are described in European Patent No. 0566118, which is incorporated by reference herein.

The swelling agent is preferably hydrophilic and is thus physically attracted to water molecules. In the case where the swelling agent is a crystalline polymer, the polymer chain deflects and surrounds the water molecules during water absorption. In effect, the polymer undergoes a change from that of a dehydrated crystal to that of a hydrated gel as it absorbs water. Once fully hydrated, the gel preferably exhibits a high resistance to the migration of water therethrough. That is, the molecules of the gel are sufficiently packed together to substantially inhibit water from passing through the gel. Further, the gel can plug permeable areas of the well bore or the cement sheath because it can withstand substantial amounts of pressure without being dislodged or extruded.

As the swelling agent undergoes hydration, its physical size increases by about 10 to 400 times its original volume. The amount and rate by which the swelling agent increases in size vary depending upon its temperature, its grain size, and the ionic strength of the carrier fluid. The temperature of a well bore generally increases from top to bottom such that the rate of swelling increases as the swelling agent passes downhole. The rate of swelling also increases as the grain size of the swelling agent decreases and as the ionic strength of the carrier fluid decreases. For example, the mass of a DIAMOND SEAL polymer having a 14 mm grind size increases by 0% in 20 minutes after contacting water at 80° F., 150% in 35 minutes after contacting the water, and 400% in 45 minutes after contacting the water. The mass of the DIAMOND SEAL polymer increases by 0% in 15 minutes after contacting water at 145° F., 200% in 25 minutes after contacting the water, and 400% in 35 minutes after contacting the water. The mass of the DIAMOND SEAL polymer increases by 0% in 45 minutes after contacting 9.2 pounds/gallon (ppg) brine water at 80° F., 25% in 60 minutes after contacting the brine water, and 50% in 75 minutes after contacting the brine water. The mass of the DIAMOND SEAL polymer increases by 0% in 30 minutes after contacting 9.2 ppg brine water at 145° F., 25% in 45 minutes after contacting the brine water, and 50% in 60 minutes after contacting the brine water.

According to some embodiments, the swelling agent may be combined with a carrier fluid to form a carrier solution before being placed in a well bore. The carrier fluid may be any suitable fluid for moving the swelling agent to desired locations in the well bore. The swelling agent is incorporated therein in an effective amount for plugging a source of water upon being placed down hole and the effective amount may vary depending on factors such as the type of the carrier fluid, the amount of mobile water flow in the well bore, the size of the water source (i.e., size of a fracture, fissure, etc.), and the like. The carrier fluid is preferably a pumpable fluid. Examples of carrier fluids with which the swelling agent may be combined include but are not limited to fresh water, deionized water, brine water of varying salinity, chloride solutions such as calcium dichloride and potassium chloride solutions, hydrocarbons such as produced oil and diesel oil, and synthetic fluids such as ester or polymer based fluids. The amount of swelling agent that may be combined with the carrier fluid depends on a number of factors including the type of carrier fluid, the volume capacities of the well's tubulars in conjunction with the placement rate logistical timing, the flow rate and pressure from the mobile water in and intruding into the well bore, and diagnostics performed to define the apparent voidage or communicating areas. Because swelling of the swelling agent may be delayed until the swelling agent is placed downhole, preferably the carrier fluid contains relatively high concentrations of the swelling agent and remains sufficiently non-viscous in order to be pumped downhole. In general, the swelling agent may be present in the carrier fluid in an amount of from about 0.001 to about 5.0 ppg, more preferably from about 0.01 to about 2.0 ppg. The carrier fluid containing the swelling agent is displaced into the well bore before cement slurries are displaced into the well bore. The designed placement procedure may address such conditions as loss circulation (fluid within the wellbore lost to particular portions of the formations and depth intervals), encountered intervals with crossflowing water, and influxes of water. As a result, the viscosities and rheologies of the subsequently placed cement slurries are less likely to be altered by the carrier fluid.

According to alternative embodiments, the swelling agent may be combined with a cement composition before being placed in a well bore. Cement compositions of the present invention may contain cements such as hydraulic cement composed of calcium, aluminum, silicon, oxygen, and/or sulfur which sets and hardens by reaction with water. Examples of hydraulic cements are Portland cements, pozzolan cements, gypsum cements, high alumina content cements, silica cements, and high alkalinity cements. The cement is preferably a Portland cement, more preferably a class A, B, C, G, or H Portland cement, and most preferably a class C or H Portland cement. A sufficient amount of fluid may also be added to the cement to form a pumpable cementitious slurry. The fluid is preferably fresh water or salt water, e.g., an unsaturated aqueous salt solution or a saturated aqueous salt solution such as brine or seawater. An effective amount of swelling agent is combined with such cement compositions to plug a source of water upon placing the cement down hole, and the effective amount may vary depending on factors such as the type of cement, the amount of mobile water flow in the well bore, the pore pressure and influx rate of the water source (i.e., size of a fracture, fissure, etc.), and the like. In general, the cement compositions may contain from about 1 to about 50% by weight swelling agent per total weight of a cement composition such that a density of the cement composition ranges from about 9.0 to about 12.0 pounds per gallon.

As deemed appropriate by one skilled in the art, additional additives may be added to the cement compositions for improving or changing the properties of the cement composition. Examples of such additives include, but are not limited to set, fluid loss control additives, defoamers, dispersing agents, set accelerators, and formation conditioning agents. Such cement compositions may be made by any suitable method as known to those of skill in the art.

If desired, the swelling agent may be removed from the well bore or area of its placement after it has been used for its intended purpose. If the swelling agent is a polymer, the backbone structure of the polymer may be broken down such that it becomes more like a liquid. Any known means may be used to break down or collapse the polymer. For example, the polymer may be contacted with an oxidizer such as sodium hypochlorite (i.e., bleach), or combinations thereof to eliminate the polymer from the well bore, preferably by pumping such compounds down the well bore and contacting the swollen swelling agent in situ.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

Example 1

Different grind sizes of the DIAMOND SEAL polymer (DS) were mixed with various carrier solutions at different concentrations to form several test samples. These carrier solutions were fresh water, field produced brine water, NaCl brine made by adding NaCl to fresh water, and $CaCl_2$ aqueous solution made by adding $CaCl_2$ to fresh water. The test samples were then subjected to different temperatures and observed to determine the swelling time and the amount of swelling of the DIAMOND SEAL polymer. Table 1 below shows the results of this example.

TABLE 1

| DIAMOND SEAL Polymer Grind Size | Carrier Fluid | Concentration of DS in Carrier Fluid | Temp., °F. | Initial Hydration, hr.:min. | Final Hydration, hr.:min. | Swelling Increase, % By Volume |
|---|---|---|---|---|---|---|
| 425-1000 microns | Fresh Water | 0.2 lb/gal (ppg) | 80 | 0:09 | 0:15 | 400 |
| | | 0.4 ppg | 80 | 0:09 | 0:15 | 400 |
| | | 0.5 ppg | 80 | 0:09 | 0:15 | 400 |
| 425-1000 microns | Fresh Water | 0.2 ppg | 120 | 0:03 | 0:09 | 400 |
| | | 0.4 ppg | 120 | 0:03 | 0:09 | 400 |
| | | 0.5 ppg | 120 | 0:03 | 0:09 | 400 |
| 4 mm | Fresh Water | 0.2 ppg | 80 | 0:18 | 0:25 | 500 |
| | | 0.4 ppg | 80 | 0:18 | 0:25 | 500 |
| | | 0.5 ppg | 80 | 0:18 | 0:25 | 450 |
| 4 mm | Fresh Water | 0.2 ppg | 120 | 0:14 | 0:20 | 500 |
| | | 0.4 ppg | 120 | 0:14 | 0:20 | 450 |
| | | 0.5 ppg | 120 | 0:14 | 0:20 | 400 |
| 14 mm | Fresh Water | 0.2 ppg | 80 | 0:20 | 0:30 | 500 |
| | | 0.4 ppg | 80 | 0:20 | 0:25 | 450 |
| | | 0.5 ppg | 80 | 0:20 | 0:25 | 400 |
| 14 mm | Fresh Water | 0.2 ppg | 120 | 0:17 | 0:25 | 500 |
| | | 0.4 ppg | 120 | 0:16 | 0:25 | 450 |
| | | 0.5 ppg | 120 | 0:16 | 0:25 | 400 |
| 425-1000 microns | Brine Water, 9.5 ppg | 0.2 ppg | 80 | 0:25 | 0:28 | 150 |
| | | 0.4 ppg | 80 | 0:20 | 0:28 | 125 |
| 425-1000 microns | Brine Water, 9.5 ppg | 0.2 ppg | 120 | 0:15 | 0:25 | 150 |
| | | 0.4 ppg | 120 | 0:15 | 0:25 | 125 |
| 4 mm | Brine Water, 9.5 ppg | 0.5 ppg | 80 | 0:20 | 0:33 | 150 |
| | | 1.0 ppg | 80 | 0:20 | 0:30 | 100 |
| 4 mm | Brine Water, 9.5 ppg | 0.5 ppg | 120 | 0:18 | 0:30 | 175 |
| | | 1.0 ppg | 120 | 0:18 | 0:27 | 150 |
| 14 mm | Brine Water, 9.5 ppg | 0.5 ppg | 80 | 0:25 | 0:40 | 150 |
| | | 1.0 ppg | 80 | 0:25 | 0:45 | 100 |
| 14 mm | Brine Water, 9.5 ppg | 0.5 ppg | 120 | 0:20 | 0:35 | 150 |
| | | 1.0 ppg | 120 | 0:20 | 0:35 | 125 |
| 425-1000 microns | Brine Water, 10.0 ppg | 0.2 ppg | 80 | 0:35 | 0:40 | 125 |
| | | 0.4 ppg | 80 | 0:30 | 0:40 | 100 |
| 425-1000 microns | Brine Water, 10.0 ppg | 0.2 ppg | 120 | 0:20 | 0:35 | 150 |
| | | 0.4 ppg | 120 | 0:20 | 0:35 | 100 |
| 4 mm | Brine Water, 10.0 ppg | 0.5 ppg | 80 | 0:25 | 0:45 | 100 |
| | | 1.0 ppg | 80 | 0:25 | 0:45 | 50 |
| 4 mm | Brine Water, 10.0 ppg | 0.5 ppg | 120 | 0:30 | 0:55 | 100 |
| | | 1.0 ppg | 120 | 0:30 | 0:55 | 50 |
| 14 mm | Brine Water, 10.0 ppg | 0.5 ppg | 80 | 0:25 | 0:45 | 100 |
| | | 1.0 ppg | 80 | 0:25 | 0:45 | 50 |
| 14 mm | Brine Water, 10.0 ppg | 0.5 ppg | 120 | 0:25 | 0:55 | 100 |
| | | 1.0 ppg | 120 | 0:25 | 0:55 | 50 |
| 4 mm | 1 wt. % NaCl Brine | 4 lbs/barrell (ppb) (11.43 kg/m³) | Ambient (~20° C.) | 0:30 | 0:60 | 300 |
| 14 mm | 1 wt. % NaCl Brine | 4 ppb (11.43 kg/m3) | Ambient (~20° C.) | 0:30 | 0:60 | 275 |
| 4 mm | 2 wt. % NaCl Brine | 4 ppb (11.43 kg/m3) | Ambient (~20° C.) | 0:40 | 0:60 | 250 |
| 14 mm | 2 wt. % NaCl Brine | 4 ppb (11.43 kg/m3) | Ambient (~20° C.) | 0:40 | 1:20 | 235 |
| 4 mm | 3 wt. % NaCl Brine | 4 ppb (11.43 kg/m3) | Ambient (~20° C.) | 0:45 | 1:45 | 215 |
| 14 mm | 3 wt. % NaCl Brine | 4 ppb (11.43 kg/m3) | Ambient (~20° C.) | 0:45 | 1:45 | 200 |
| 4 mm | 8.5 ppg $CaCl_2$ solution | 0.2 ppg | Ambient (~20° C.) | >1 hr. | 2:0 | 200 |
| 4 mm | 9.0 ppg $CaCl_2$ solution | 0.2 ppg | Ambient (~20° C.) | 1:30 | 3:0 | 100 |
| 4 mm | 9.5 ppg $CaCl_2$ solution | 0.2 ppg | Ambient (~20° C.) | 2:0 | 4:0 | 125 |
| 4 mm | 10.0 ppg $CaCl_2$ solution | 0.2 ppg | Ambient (~20° C.) | 2:30 | 5:0 | 50 |
| 4 mm | 10.2 ppg $CaCl_2$ solution | 0.2 ppg | Ambient (~20° C.) | 5:30 | 7:0 | 25 |
| 4 mm | 10.3 ppg $CaCl_2$ solution | 0.2 ppg | Ambient (~20° C.) | 7:0 | 9:0 | 10 |
| 4 mm | 10.5 ppg $CaCl_2$ solution | 0.2 ppg | Ambient (~20° C.) | 13:0 | 24:0 | 10 |
| 4 mm | 11.0 ppg $CaCl_2$ solution | 0.2 ppg | Ambient (~20° C.) | | | did not swell |

Based on these results, the swelling time of the DIAMOND SEAL polymer varied depending on the ionic strength of the carrier fluid being used. In particular, the time required for the DIAMOND SEAL polymer to swell, i.e., the swelling time, increased as the carrier fluid changed from fresh water to brine water and from brine water to a $CaCl_2$ solution. In contrast, the DIAMOND SEAL polymer experienced the most amount of swelling in the fresh water and the least amount of swelling in the $CaCl_2$ solution, indicating that it absorbs more water when in fresh water than in water containing salts. Further, the amount of swelling generally decreased as the concentration of the DIAMOND SEAL polymer in the carrier fluid increased. In addition, the swelling time generally increased as the grind size of the DIAMOND SEAL polymer increased, whereas the swelling time generally decreased as the temperature increased.

Example 2

The DIAMOND SEAL polymer was mixed with fresh water such that the water contained 0.2 lbs. DS/gallon water. Several samples (samples 1-4) of the resulting mixture were then allowed to hydrate at room temperature (70° F.) and at 110° F. to determine the expansion rate of the DIAMOND SEAL polymer at the different temperatures. Table 2 below shows the results of this example.

TABLE 2

| Sample | Temperature, ° F. | Expansion in Size |
|---|---|---|
| 1 | 70 | 100% in 30 min. |
| 2 | 110 | 100% in 30 min. |
| 3 | 70 | 200% in 2 hours |
| 4 | 110 | 200% in 1 hour |

Based on the results shown in Table 2, the expansion rates of the DIAMOND SEAL polymer were initially the same at room temperature (70° F.) and at the bottom hole test temperature (110° F.). In particular, samples 1 and 2 both expanded by 100% for the first 30 minuets. However, the expansion rate of the DIAMOND SEAL polymer at the higher temperature, i.e., the bottom hole test temperature, later became greater than that of the DIAMOND SEAL polymer at room temperature. In particular, sample 3 took 2 hours to expand in size by 200%, whereas sample 4 took 1 hour to expand in size by 200%.

Example 3

The DIAMOND SEAL polymer was mixed with different amounts of PREMIUM cement (class H) or PREMIUM PLUS cement (class C), both of which are commercially available from Southdown, Inc. Different amounts of water were then added to the resulting slurries, thereby forming various test samples. Additives manufactured by Halliburton, Inc. were added to some of the samples. Each test sample was subjected to a thickening time test, whereby an atmospheric consistometer was used to determine the thickening time of the sample at 80° F. in accordance with American Petroleum Institute (API) Recommended Practice, Specification 10B, $22^{nd}$ Ed., Dec. 1997. According to API standards, a consistency of 70 Bearden Units (Bc) is not pumpable. Each sample was also subjected to a hydration test, whereby it was observed in a static state at room temperature. The results of these tests are shown below in Table 3.

TABLE 3

| Cement Slurry Density, ppg | H$_2$O Added, mL | Slurry Yield, ft.$^3$/94 lb sack | DIAMOND SEAL Polymer in the Slurry, ppg | Other Additives, wt. % based on the total weight of the cement composition | Thickening Time Test, Bc @ hr.:min. | Hydration Test |
|---|---|---|---|---|---|---|
| 11.00 | 17.53 | 3.04 | 10 | None | 60 Bc @ 0:05 | Unpourable @ 1 min. |
| 10.50 | 22.77 | 3.74 | 10 | None | 60 Bc @ 0:15 | Unpourable @ 5 min. |
| 10.00 | 31.14 | 4.86 | 10 | None | 70 Bc @ 0:45 | Unpourable @ 10 min. |
| 10.00 | 31.14 | 4.86 | 20 | None | 70 Bc @ 0:15 | Unpourable @ 5 min. |
| 9.50 | 46.65 | 6.93 | 20 | None | 70 Bc @ 0:20 | Unpourable @ 8 min. |
| 9.50 | 46.65 | 6.93 | 10 | None | 28 Bc @ 4:00 | Unpourable @ 1 hr., some free water |
| 9.50 | 46.65 | 6.93 | 5 | None | 15 Bc @ 4:00 | Unpourable @ 1 hr 30 min., some free water |
| 9.00 | 85.26 | 12.09 | 10 | 1% THIXSET A thixotropic additive, 0.25% THIXSET B thixotropic additive | | 50 vol. % free water, 20% size increase in 1 hour |
| 9.00 | 85.26 | 12.09 | 10 | 1% VERSASET thixotropic additive | | 25 vol. % free water, 40% size increase in 1 hour |
| 9.50 | 46.65 | 6.93 | 10 | 1% THIXSET A thixotropic additive, .25% | | 10 vol. % free water, 70% size increase in 1 hour |

TABLE 3-continued

| Cement Slurry Density, ppg | H$_2$O Added, mL | Slurry Yield, ft.$^3$/94 lb sack | DIAMOND SEAL Polymer in the Slurry, ppg | Other Additives, wt. % based on the total weight of the cement composition | Thickening Time Test, Bc @ hr.:min. | Hydration Test |
|---|---|---|---|---|---|---|
| 9.50 | 46.65 | 6.93 | 10 | THIXSET B thixotropic additive 1% VERSASET thixotropic additive | | 0% free water, 100% size increase in 1 hour, unpourable |
| 9.00 | 86.92 | 12.33 | 10 | 2% bentonite | | 0% free water, no size increase @ 20 min. |

As shown in Table 3, when no additional additives were employed, the presence of the DIAMOND SEAL polymer in the test samples allowed the samples to thicken in a reasonable amount of time by absorbing the water added to the samples. In the test samples containing THIXSET thixotropic additives, a percentage (based on the total volume of the water) of the water in the samples floated out as free water that had not been absorbed by the DIAMOND SEAL polymer. Likewise, when 85.26 mL of water was added to a test sample containing a VERSASET thixotropic additive, free water floated out of the sample. However, when less water i.e., 46.64 mL, was added to another test sample containing the VERSASET thixotropic additive, all of the water was absorbed, allowing the sample to thicken. In the test sample containing bentonite, the bentonite rather than the DIAMOND SEAL polymer absorbed the water. This was due to the immediate absorption potential of the bentonite and the delayed potential for absorption with the Diamond Seal.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of cementing in a subterranean formation comprising:
   running a casing in a wellbore;
   plugging a water source in the subterranean formation with a swelling agent comprising a superabsorbent to reduce an amount of water flowing into a cement slurry, wherein the superabsorbent is a sodium acrylate-based polymer wherein the superabsorbent has an original volume and is capable of increasing in volume from about 10 to 400 times the original volume, and wherein the swelling agent is present in the cement slurry in an amount ranging from about 1 to about 50% by weight of the cement slurry;
   pumping the cement slurry into the subterranean formation; and
   allowing the slurry to set.

2. The method of claim 1 wherein the swelling agent is insoluble in the water.

3. The method of claim 1 wherein said plugging a water source in the subterranean formation is performed before said pumping the cement slurry into the subterranean formation.

4. The method of claim 1 wherein the cement slurry is pumped into the subterranean formation during a primary cementing process.

5. The method of claim 1 wherein the cement slurry is pumped into the subterranean formation during a secondary cementing process.

6. The method of claim 1, further comprising determining a location of the water in the subterranean formation before said plugging a water source in the subterranean formation with a swelling agent.

7. The method of claim 6, further comprising placing the swelling agent in close proximity to the location of the water.

8. A method of cementing in a subterranean formation comprising:
   running a casing in a wellbore;
   passing a swelling agent into the subterranean formation to reduce an amount of water flowing into a cement slurry, wherein the swelling agent comprises a superabsorbent, wherein the superabsorbent is a sodium acrylate-based polymer wherein the superabsorbent has an original volume and is capable of increasing in volume from about 10 to 400 times the original volume, and wherein the swelling agent is present in the cement slurry in an amount ranging from about 1 to about 50% by weight of the cement slurry;
   pumping the cement slurry into the subterranean formation; and
   allowing the slurry to set.

9. A method of cementing in a subterranean formation comprising:
running a casing in a wellbore;
passing a swelling agent into the subterranean formation to reduce an amount of water flowing into a cement slurry;
pumping the cement slurry into the subterranean formation; and
allowing the slurry to set;
wherein said passing the swelling agent into the subterranean formation is performed before said pumping the cement slurry into the subterranean formation;
wherein said passing the swelling agent into the subterranean formation comprises combining the swelling agent with a carrier solution and placing the carrier solution into a wellbore; and
wherein a swelling time of the swelling agent increases as an ionic strength of the carrier fluid increases.

10. The method of claim 9 wherein the carrier solution comprises at least one of fresh water, brine water, a potassium chloride solution, a calcium chloride solution, and a hydrocarbon.

11. The method of claim 10 wherein the swelling agent is present in the carrier solution in an amount ranging from about 0.001 to about 5.0 pounds per gallon of the carrier solution.

12. The method of claim 10 wherein the swelling agent is present in the carrier solution in an amount ranging from about 0.01 to about 2.0 pounds per gallon of the carrier solution.

13. The method of claim 6 further comprising: removing the swelling agent from the subterranean formation.

14. The method of claim 9 wherein the swelling agent comprises a sodium acrylate-based polymer.

15. The method of claim 9 wherein the swelling agent is selected from the group consisting of polyacrylate, hydrolyzed polyacrylonitrile, carboxyalkyl cellulose, carboxymethyl starch, salts of carboxymethyl cellulose, carboxyalkyl polysaccharide, and combinations thereof.

16. A method of cementing in a subterranean formation comprising:
running a casing in a wellbore;
passing a swelling agent into the subterranean formation to reduce an amount of water flowing into a cement slurry, wherein the swelling agent comprises a sodium acrylate-based polymer;
altering the thixotropy of the cement slurry by combining a thixotropic additive with the cement slurry and the swelling agent before pumping them into the subterranean formation;
pumping the cement slurry into the subterranean formation; and
allowing the slurry to set;
wherein said passing the swelling agent into the subterranean formation is performed concurrently with said pumping the cement slurry into the subterranean formation.

17. The method of claim 16, further comprising combining the swelling agent with the cement slurry before pumping them into the subterranean formation.

18. The method of claim 16 wherein the swelling agent is present in the cement slurry in an amount ranging from about 1 to about 10% by weight of the cement slurry.

19. The method of claim 16 wherein the swelling agent comprises a sodium acrylate-based polymer.

20. The method of claim 16 wherein the swelling agent is selected from the group consisting of polyacrylate, hydrolyzed polyacrylonitrile, carboxyalkyl cellulose, carboxymethyl starch, salts of carboxymethyl cellulose, carboxyalkyl polysaccharide, and combinations thereof.

21. A method of cementing in a subterranean formation comprising:
running a casing in a wellbore;
passing a swelling agent into the subterranean formation to reduce an amount of water flowing into a cement slurry;
pumping the cement slurry into the subterranean formation; and
allowing the slurry to set;
wherein said passing the swelling agent into the subterranean formation is performed before said pumping the cement slurry into the subterranean formation; and
wherein said passing the swelling agent into the subterranean formation comprises combining the swelling agent with a carrier solution and placing the carrier solution into a wellbore; and
removing the swelling agent from the subterranean formation, wherein said removing the swelling agent from the subterranean formation comprises contacting the swelling agent with an oxidizer.

22. The method of claim 21 wherein the oxidizer is sodium hypochlorite.

23. The method of claim 21 wherein the swelling agent comprises a sodium acrylate-based polymer.

24. The method of claim 21 wherein the swelling agent is selected from the group consisting of polyacrylate, hydrolyzed polyacrylonitrile, carboxyalkyl cellulose, carboxymethyl starch, salts of carboxymethyl cellulose, carboxyalkyl polysaccharide, and combinations thereof.

25. A method of cementing in a subterranean formation comprising:
running a casing in a wellbore;
passing a swelling agent into the subterranean formation to reduce an amount of water flowing into a cement slurry;
pumping the cement slurry into the subterranean formation; and
allowing the slurry to set;
wherein said passing the swelling agent into the subterranean formation is performed before said pumping the cement slurry into the subterranean formation;
wherein said passing the swelling agent into the subterranean formation comprises combining the swelling agent with a carrier solution and placing the carrier solution into a wellbore; and wherein an amount by which the swelling agent increases in size as it swells decreases as an ionic strength of the carrier fluid increases.

26. The method of claim 25 wherein the swelling agent comprises a sodium acrylate-based polymer.

27. The method of claim 25 wherein the swelling agent is selected from the group consisting of polyacrylate, hydrolyzed polyacrylonitrile, carboxyalkyl cellulose, carboxymethyl starch, salts of carboxymethyl cellulose, carboxyalkyl polysaccharide, and combinations thereof.

28. A method of cementing in a subterranean formation comprising:
running a casing in a wellbore;
passing a swelling agent into the subterranean formation to reduce an amount of water flowing into a cement slurry;
pumping the cement slurry into the subterranean formation; and
allowing the slurry to set;
wherein said passing the swelling agent into the subterranean formation is performed before said pumping the cement slurry into the subterranean formation;
wherein said passing the swelling agent into the subterranean formation comprises combining the swelling agent with a carrier solution and placing the carrier solution into a wellbore; and wherein an amount by which the swelling agent increases in size as it swells decreases as a concentration of the swelling agent in the carrier fluid increases.

29. The method of claim 28 wherein the swelling agent comprises a sodium acrylate-based polymer.

30. The method of claim 28 wherein the swelling agent is selected from the group consisting of polyacrylate, hydrolyzed polyacrylonitrile, carboxyalkyl cellulose, carboxymethyl starch, salts of carboxymethyl cellulose, carboxyalkyl polysaccharide, and combinations thereof.

* * * * *